United States Patent
Yazaki et al.

(10) Patent No.: US 11,699,057 B2
(45) Date of Patent: Jul. 11, 2023

(54) RFID TAG AND METHOD FOR PRODUCING THE SAME

(71) Applicant: Murata Manufacturing Co., Ltd., Nagaokakyo (JP)

(72) Inventors: Hirokazu Yazaki, Nagaokakyo (JP); Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 99 days.

(21) Appl. No.: 17/083,713

(22) Filed: Oct. 29, 2020

(65) Prior Publication Data

US 2021/0042597 A1 Feb. 11, 2021

Related U.S. Application Data

(63) Continuation of application No. PCT/JP2019/002715, filed on Jan. 28, 2019.

(30) Foreign Application Priority Data

Jun. 15, 2018 (JP) ................. 2018-114369

(51) Int. Cl.
*G06K 19/07* (2006.01)
*H01Q 1/22* (2006.01)
*H01Q 7/00* (2006.01)

(52) U.S. Cl.
CPC ....... *G06K 19/0723* (2013.01); *H01Q 1/2283* (2013.01); *H01Q 7/00* (2013.01)

(58) Field of Classification Search
CPC ..... G06K 19/0723; H01Q 1/2283; H01Q 7/00
(Continued)

(56) References Cited

U.S. PATENT DOCUMENTS 7,292,148 B2* 11/2007 Forster ............. G06K 19/07749
343/895
2005/0173532 A1* 8/2005 Hasebe ................... H01Q 7/00
235/492

(Continued)

FOREIGN PATENT DOCUMENTS

JP 2004213196 A 7/2004
JP 2004281838 A 10/2004

(Continued)

OTHER PUBLICATIONS

International Search Report issued for PCT/JP2019/002715, dated Feb. 26, 2019.

(Continued)

*Primary Examiner* — Michael G Lee
*Assistant Examiner* — David Tardif
(74) *Attorney, Agent, or Firm* — ArentFox Schiff LLP

(57) ABSTRACT

An RFID tag is provided that has reduced size while a decrease in communication distance is prevented. The RFID tag includes an inductor element having a coiled antenna built in a substrate and an RFIC element mounted on a mounting surface of the substrate and electrically connected to the coiled antenna. The coiled antenna is disposed such that a winding axis becomes parallel to or inclined with respect to the mounting surface of the substrate. The area of the RFIC element viewed in a direction orthogonal to the mounting surface of the substrate is larger than opening area of the coiled antenna viewed in winding axis direction of the coiled antenna. The RFIC element is disposed without overlapping at least a portion of opening region of the coiled antenna when viewed in winding axis direction of the coiled antenna.

21 Claims, 8 Drawing Sheets

(58) Field of Classification Search
USPC .......................................................... 235/492
See application file for complete search history.

(56) References Cited

U.S. PATENT DOCUMENTS

| | | |
|---|---|---|
| 2006/0086804 A1 | 4/2006 | Takayama |
| 2013/0221111 A1* | 8/2013 | Kaga ................ G06K 19/07773 |
| | | 235/492 |
| 2014/0252095 A1* | 9/2014 | Kikin ..................... H01Q 21/28 |
| | | 235/492 |
| 2015/0318624 A1* | 11/2015 | Schantz ................. H01Q 1/273 |
| | | 343/867 |
| 2017/0331190 A1* | 11/2017 | Tenno ...................... H01Q 7/00 |
| 2017/0373396 A1* | 12/2017 | Kato ..................... H01F 17/045 |

FOREIGN PATENT DOCUMENTS

| | | |
|---|---|---|
| JP | 2007273736 A | 10/2007 |
| JP | 2012201596 A | 1/2011 |
| WO | 03083770 A1 | 10/2003 |

OTHER PUBLICATIONS

Written Opinion of the International Searching Authority issued for PCT/JP2019/002715, dated Feb. 26, 2019.

* cited by examiner

RFID TAG AND METHOD FOR PRODUCING THE SAME

CROSS REFERENCE TO RELATED APPLICATIONS

The present application is a continuation of PCT/JP2019/002715 filed Jan. 28, 2019, which claims priority to Japanese Patent Application No. 2018-114369, filed Jun. 15, 2018, the entire contents of each of which are incorporated herein by reference.

TECHNICAL FIELD

The present disclosure relates to an RFID (Radio-Frequency IDentification) tag and a method for producing the same.

BACKGROUND

A conventional RFID tag has a structure in which an RFIC (Radio-Frequency Integrated Circuit) element is mounted on a mounting surface of a substrate having a built-in coiled antenna. In the conventional RFID tag, the coiled antenna has a winding axis disposed perpendicular to the mounting surface of the substrate. Moreover, the RFIC element is disposed to close an opening region of the coiled antenna when viewed in a winding axis direction of the coiled antenna.

When this RFID tag is attached to a metal surface, a flow of magnetic flux passing through the opening region of the coiled antenna in the winding axis direction is hindered by the metal surface, and, therefore, the communication distance of the RFID tag becomes shorter. On the other hand, Japanese Laid-Open Patent Publication No. 2012-201596 discloses an RFID tag configured such that the center of the coiled antenna in the winding axis direction is farther from the metal surface than the center of the substrate. According to the RFID tag of Japanese Laid-Open Patent Publication No. 2012-201596, the coiled antenna is disposed away from the metal surface, so that the influence from the metal surface can be reduced to suppress a decrease in the communication distance of the RFID tag.

Patent Document 1: Japanese Patent Application Laid-Open No. 2012-201596.

RFID tags further reduced in size are recently demanded, and a demand also exists for microminiature RFID tags in which the size of the substrate having the built-in coiled antenna is nearly the same as or smaller than the size of the RFIC element. In this case, a metal component such as a conductor pattern built in the RFIC element cannot be ignored, and the flow of the magnetic flux passing through the opening region of the coiled antenna in the winding axis direction is hindered by the metal component, so that the communication distance of the RFIC tag becomes shorter.

SUMMARY OF THE INVENTION

It is an object of the exemplary embodiments of the present disclosure to provide an RFID tag that achieves a further reduction in size while suppressing a decrease in communication distance. In addition, a method for producing the same is disclosed herein.

In an exemplary aspect, an RFID tag is provided that includes an inductor element having a coiled antenna built in a substrate; and an RFIC element mounted on a mounting surface of the substrate and electrically connected to the coiled antenna. Moreover, the coiled antenna is disposed such that a winding axis is parallel to or inclined with respect to the mounting surface of the substrate. Furthermore, the area of the RFIC element viewed in a direction orthogonal to the mounting surface of the substrate is larger than the opening area of the coiled antenna viewed in a winding axis direction of the coiled antenna. The RFIC element is also disposed without overlapping at least a portion of an opening region of the coiled antenna when viewed in the winding axis direction of the coiled antenna.

In addition, a method for producing an RFID tag is disclosed that includes preparing a wafer used as a material of the RFIC element; preparing multiple inductor elements each having a coiled antenna built in a substrate; electrically connecting the multiple inductor elements onto the wafer such that a winding axis of the coiled antenna becomes parallel to or inclined with respect to the mounting surface of the substrate, and dicing the wafer into pieces to form individual RFID tags each including one of the inductor elements.

According to the exemplary embodiments of the present disclosure, an RFID tag is provided that achieves a reduction in size while also suppressing a decrease in communication distance. Moreover, a method is provided for producing the same.

DETAILED DESCRIPTION

Figure 1:
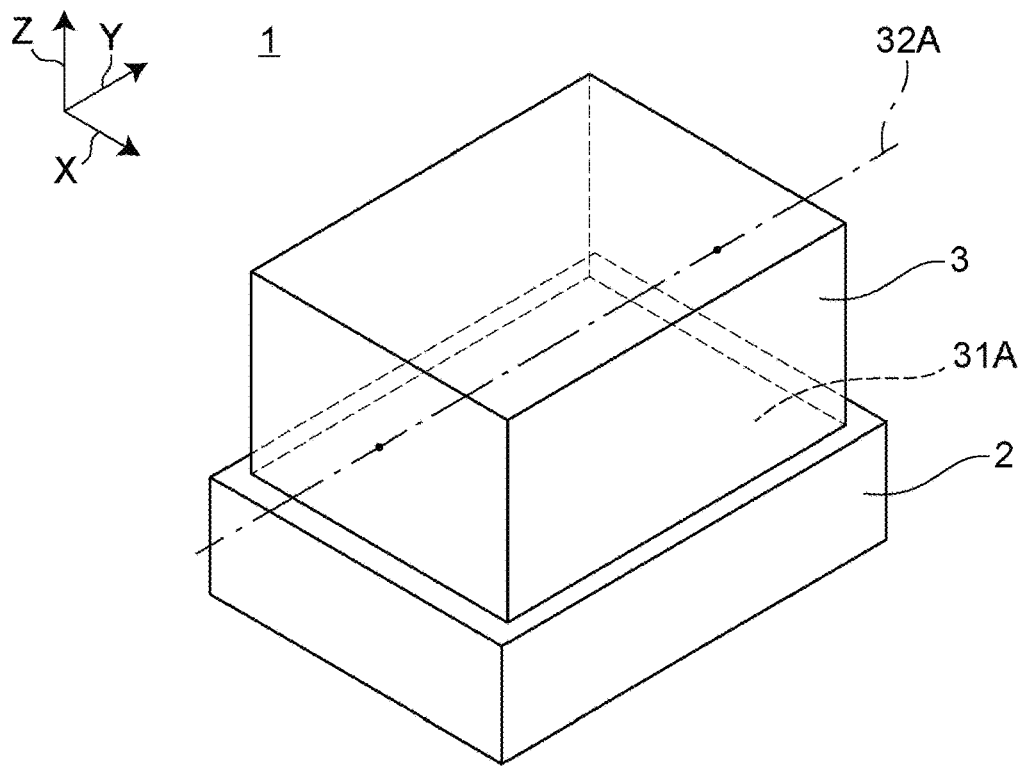
FIG. 1 is a perspective view showing a schematic configuration of an RFID tag according to an exemplary embodiment of the present disclosure.

An RFID tag of an exemplary embodiment as disclosed herein includes an inductor element having a coiled antenna built in a substrate; and an RFIC element mounted on a mounting surface of the substrate and electrically connected to the coiled antenna. Moreover, the coiled antenna is disposed such that a winding axis is parallel to or inclined with respect to the mounting surface of the substrate, and the area of the RFIC element viewed in a direction orthogonal to the mounting surface of the substrate is larger than the opening area of the coiled antenna viewed in a winding axis direction of the coiled antenna. Ye further, the RFIC element is disposed without overlapping at least a portion of an opening region of the coiled antenna when viewed in the winding axis direction of the coiled antenna.

According to this configuration, a flow of magnetic flux passing through the opening region of the coiled antenna in the winding axis direction is prevented from being hindered by the RFIC element, the RFID tag can further be reduced in size while suppressing a decrease in communication distance.

In an exemplary aspect, the RFIC element can be located outside the coiled antenna without overlapping the opening region of the coiled antenna when viewed in the winding axis direction of the coiled antenna. According to this configuration, the flow of the magnetic flux passing through the opening region of the coiled antenna in the winding axis direction is more reliably be prevented from being hindered by the RFIC element.

When viewed in the direction orthogonal to the mounting surface of the substrate, the RFIC element can have the same size as the inductor element or can have a size including the inductor element. Even with this configuration, the flow of the magnetic flux passing through the opening region of the coiled antenna in the winding axis direction can be prevented from being hindered by the RFIC element.

In an exemplary aspect, the RFIC element can be a wafer level package structure. According to this configuration, the RFID tag can further be reduced in size.

Moreover, a mounting portion between the inductor element and the RFIC element can be sealed with a resin member. According to this configuration, the mounting portion can be prevented from getting wet with water and causing a defect such as a short circuit, and the strength of the RFID tag can be improved.

In an exemplary aspect, the substrate can comprises a laminated body acquired by laminating multiple dielectric layers or magnetic layers, and the coiled antenna can comprise a laminated coiled antenna in which coil conductor patterns formed on respective layers of the laminated body are coupled by interlayer connecting conductors. According to this configuration, the opening region of the coiled antenna can be made larger relative to the size of the substrate to achieve a small size and a large inductance value, and the RFID tag can further be reduced in size.

Moreover, a method for producing an RFID tag is provided that includes preparing a wafer used as a material of the RFIC element; preparing multiple inductor elements each having a coiled antenna built in a substrate; electrically connecting the multiple inductor elements onto the wafer such that a winding axis of the coiled antenna becomes parallel to or inclined with respect to the mounting surface of the substrate, and dicing the wafer into pieces to form individual RFID tags each including one of the inductor elements.

This manufacturing method enables producing of the RFID tag that prevents the flow of the magnetic flux passing through the opening region of the coiled antenna in the winding axis direction from being hindered by the RFIC element and is also configured to achieve a reduction in size while suppressing a decrease in communication distance.

The manufacturing method can include forming a resin member to seal the multiple inductor elements electrically connected onto the wafer, and subsequently, dicing the wafer and the resin member into pieces to form individual RFID tags each including one of the inductor elements. According to this manufacturing method, a mounting portion between the inductor element and the RFIC element can be sealed with a resin member to prevent the mounting portion from getting wet with water and causing a defect such as a short circuit, and the strength of the RFID tag can be improved.

An exemplary embodiment of the present disclosure will now be described with reference to the drawings. It is noted that the present disclosure is not limited to this embodiment. Moreover, in the drawings, substantially the same members are denoted by the same reference numerals.

Figure 2:
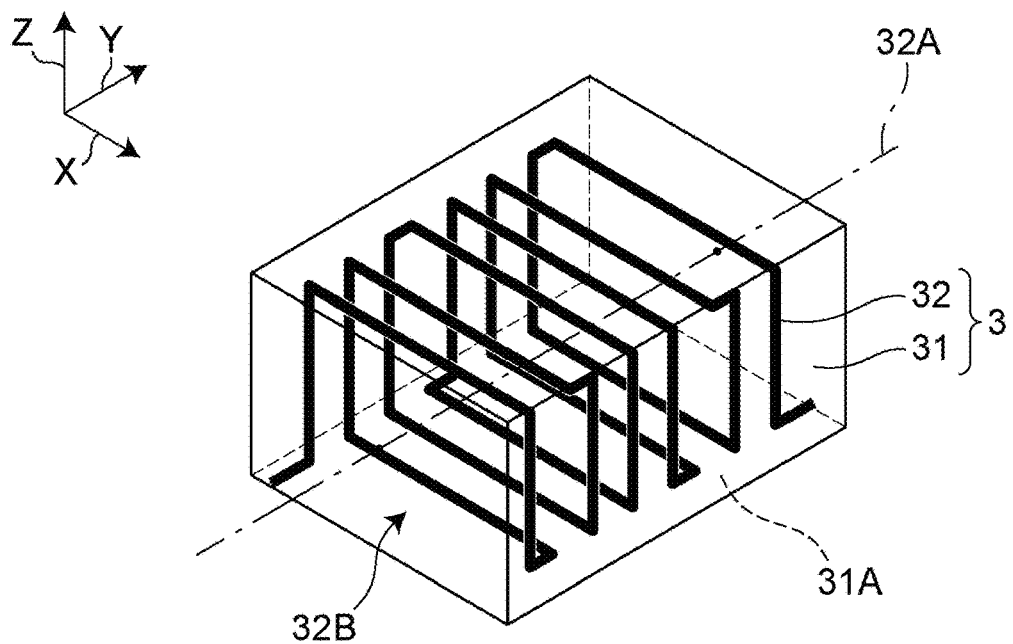
FIG. 2 is a transparent perspective view showing the inside of an inductor element included in the RFID tag of FIG. 1.
Figure 3:
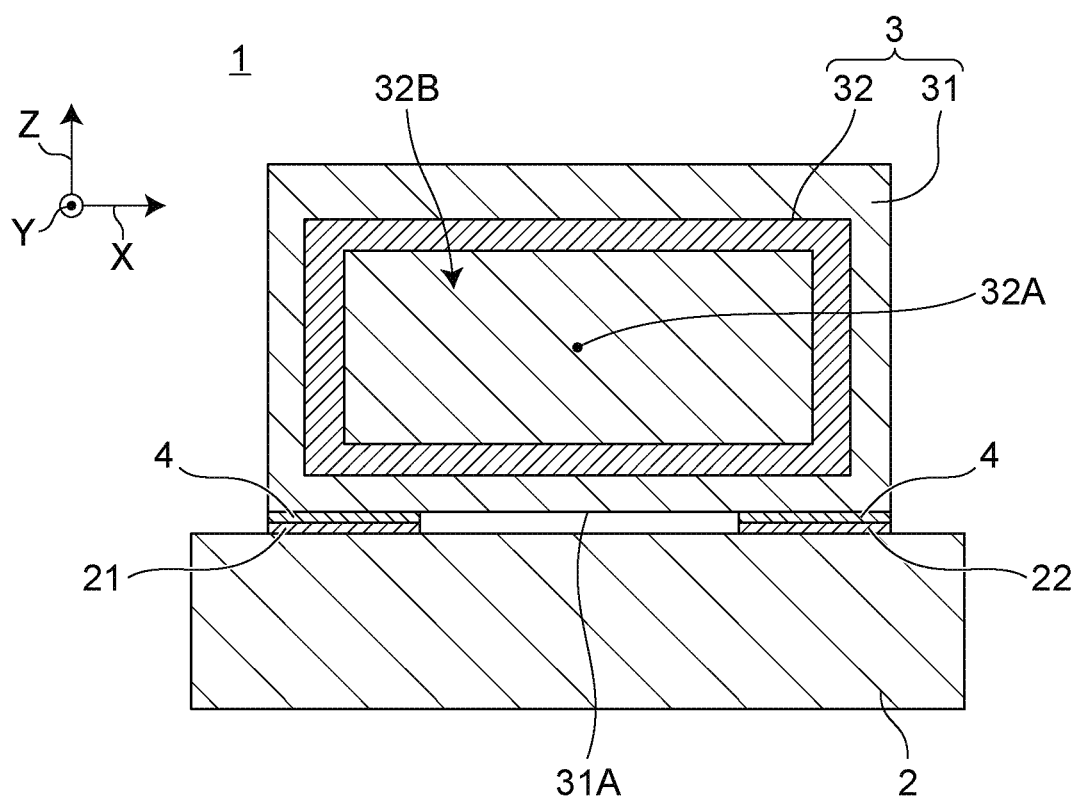
FIG. 3 is a cross-sectional view of the RFID tag of FIG. 1.
Figure 4:
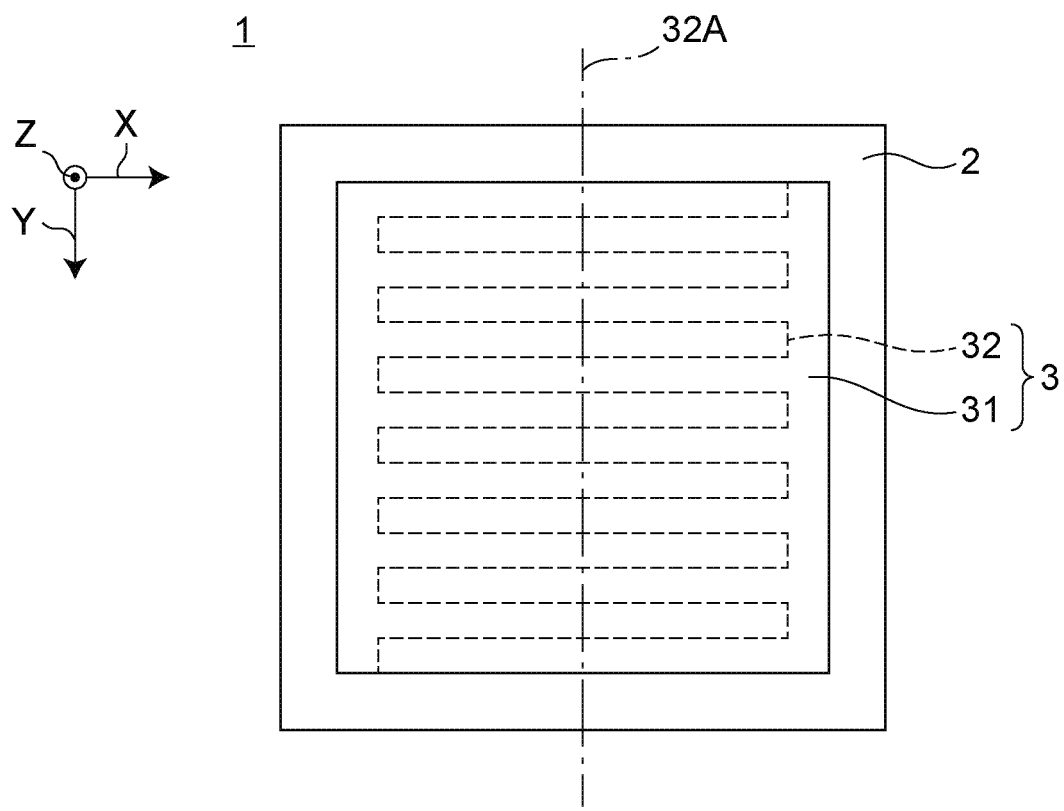
FIG. 4 is a plan view of the RFID tag of FIG. 1.

An RFID tag according to an exemplary embodiment of the present disclosure will hereinafter be described. FIG. 1 is a perspective view showing a schematic configuration of the RFID tag according to the exemplary embodiment of the present disclosure. FIG. 2 is a transparent perspective view showing the inside of an inductor element included in the RFID tag of FIG. 1. FIG. 3 is a cross-sectional view of the RFID tag of FIG. 1. FIG. 4 is a plan view of the RFID tag of FIG. 1.

As shown in FIG. 1, an RFID tag 1 according to this embodiment includes an RFIC element 2 and an inductor element 3.

The RFIC element 2 is a chip-shaped component (RFIC chip) processing a transmission/reception signal of a predetermined frequency (e.g., UHF band, HF band). In this embodiment, the RFIC element 2 is a wafer level package structure. As shown in FIG. 4, the RFIC element 2 has a size including the inductor element 3 in planar view (i.e., as viewed in the Z direction). The RFIC element 2 has a size of 0.6 mm in length in the X direction, 0.6 mm in length in the Y direction, and 0.1 mm in length in the Z direction, for example.

As shown in FIG. 3, a surface of the RFIC element 2 is provided with a pair of input/output terminals 21, 22 electrically connected to the inductor element 3. In this embodiment, the pair of the input/output terminals 21, 22 of the RFIC element 2 is connected to the inductor element 3 via solder 4. It is noted that the connection is not limited to the solder 4 and can be achieved by anisotropic conductive paste (ACP) or the like, for example.

The inductor element 3 includes a substrate 31 and a coiled antenna 32 built in or otherwise formed in the substrate 31. In this embodiment, the inductor element 3 is a chip-shaped component (e.g., a chip inductor).

The substrate 31 is a substrate having a mounting surface 31A on which the RFIC element 2 is mounted. In this embodiment, the substrate 31 is made up of a laminated body acquired by laminating multiple dielectric layers or magnetic layers. The substrate 31 is a ceramic laminated body, for example. The substrate 31 has a size of 0.4 mm in length in the X direction, 0.2 mm in length in the Y direction, and 0.2 mm in length in the Z direction, for example.

The coiled antenna 32 is a linear antenna conductor wound into a coil shape around a winding axis 32A. One end portion of the coiled antenna 32 is electrically connected to one input/output terminal 21 of the RFIC element 2. The other end portion of the coiled antenna 32 is electrically connected to the other input/output terminal 22 of the RFIC element 2. In this embodiment, the coiled antenna 32 is made up of a laminated coiled antenna in which coil conductor patterns formed on respective layers of the laminated body are coupled by interlayer connecting conductors.

As shown in FIG. 3, the area of the RFIC element 2 viewed in a direction orthogonal to the mounting surface 31A of the substrate 31 is designed to be larger than the opening area of the coiled antenna 32 viewed in the winding axis direction (i.e., the Y direction) of the coiled antenna 32. Therefore, the RFID tag 1 according to this embodiment is a microminiature RFID tag in which the size of the coiled antenna 32 is smaller than the size of the RFIC element 2. The coiled antenna 32 has a size of 0.35 mm in length in the X direction, 0.15 mm in length in the Y direction, and 0.15 mm in length in the Z direction, for example.

As shown in FIG. 3, the RFIC element 2 is disposed without overlapping at least a portion of an opening region 32B of the coiled antenna 32 when viewed in the winding axis direction (i.e., the Y direction) of the coiled antenna 32. In this embodiment, the coiled antenna 32 is disposed such that the winding axis 32A is parallel to the mounting surface 31A of the substrate. The RFIC element 2 is located outside the coiled antenna 32 without overlapping the opening region of the coiled antenna 32 when viewed in the winding axis direction of the coiled antenna 32.

Figure 5:
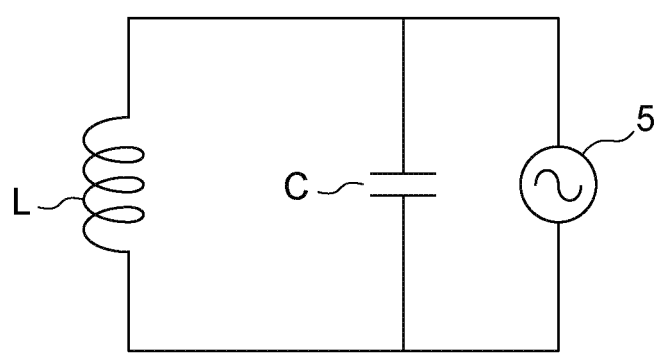
FIG. 5 is an equivalent circuit diagram of the RFID tag of FIG. 1.

FIG. 5 is an equivalent circuit diagram of the RFID tag 1.

In this embodiment, the RFIC element 2 functions as a power feeding part 5 supplying electric power, the coiled antenna 32 functions as an inductor L, and the internal capacitances of the RFIC element 2 and the substrate 31 function as a capacitor C. As a result, an LC parallel resonant circuit is formed.

The RFID tag 1 according to this embodiment can wirelessly communicate with a reader/writer (not shown) of an RFID system. When an antenna of the reader/writer is brought close to the RFID tag 1, a magnetic flux based on a signal of a predetermined frequency (e.g., UHF band, HF band) radiated from the antenna flows through the opening region 32B of the coiled antenna 32 in the winding axis direction. As a result, a current flows through the coiled antenna 32. This current is supplied to the RFIC element 2, and the RFIC element 2 operates. On the other hand, a response signal from the RFIC element 2 is radiated as a magnetic field from the coiled antenna 32 and read by the reader/writer. In this case, a magnetic field radiated from the coiled antenna 32 generates a flow of magnetic flux passing through the opening region 32B of the coiled antenna 32 in the winding axis direction.

According to the RFID tag 1 of this embodiment, the winding axis 32A of the coiled antenna 32 is disposed parallel to the mounting surface 31A of the substrate 31. The RFIC element 2 is disposed without overlapping with the opening region 32B of the coiled antenna 32 when viewed in the winding axis direction of the coiled antenna 32. This configuration prevents the flow of magnetic flux passing through the opening region 32B of the coiled antenna 32 in the winding axis direction from being hindered by the RFIC element 2. According to the configuration described above, even when an eddy current is generated on the mounting surface of the RFIC element 2, the magnetic flux due to the eddy current does not hinder the flow of the magnetic flux passing through the opening region 32B of the coiled antenna 32 in the winding axis direction. As a result, the RFID tag 1 can further be reduced in size while suppressing a decrease in the communication distance.

According to the RFID tag 1 of this embodiment, since the RFIC element 2 is a wafer level package structure, the RFID tag 1 can further be reduced in size.

According to the RFID tag 1 of this embodiment, the substrate 31 is made up of a laminated body, and the coiled antenna 32 is made up of a laminated coiled antenna. According to this configuration, the opening region 32B of the coiled antenna 32 can be made larger relative to the size of the substrate 31 to achieve a small size and a large inductance value, and the RFID tag 1 can further be reduced in size.

Figure 6:
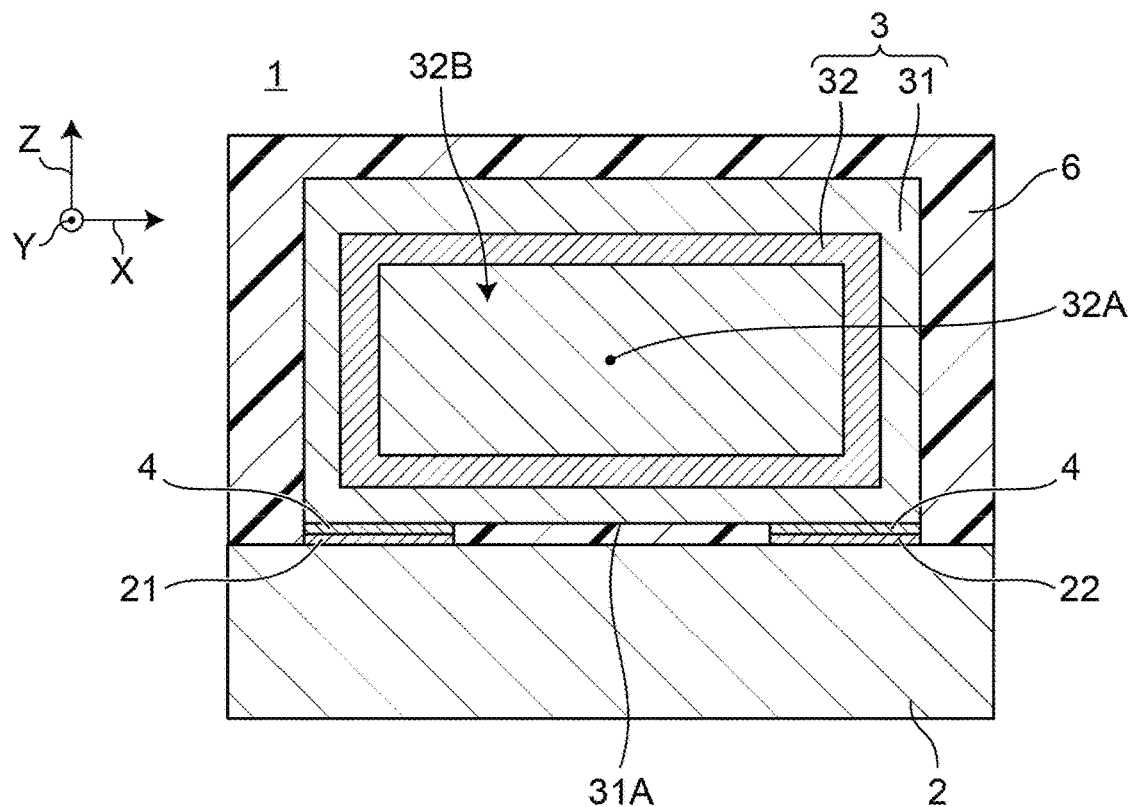
FIG. 6 is a cross-sectional view showing a first modification of the RFID tag of FIG. 1.

As shown in FIG. 6, a mounting portion between the inductor element 3 and the RFIC element 2 may be sealed with a resin member 6 such as an epoxy resin. According to this configuration, the mounting portion can be prevented from getting wet with water and causing a defect such as a short circuit, and the strength of the RFID tag 1 can be improved.

An example of a method for producing the RFID tag shown in FIG. 6 will be described. FIGS. 7A to 7D are schematic views showing an example of the method for producing the RFID tag of FIG. 6. FIGS. 7B to 7D are enlarged views of a portion of FIG. 7A.

Figure 7A:
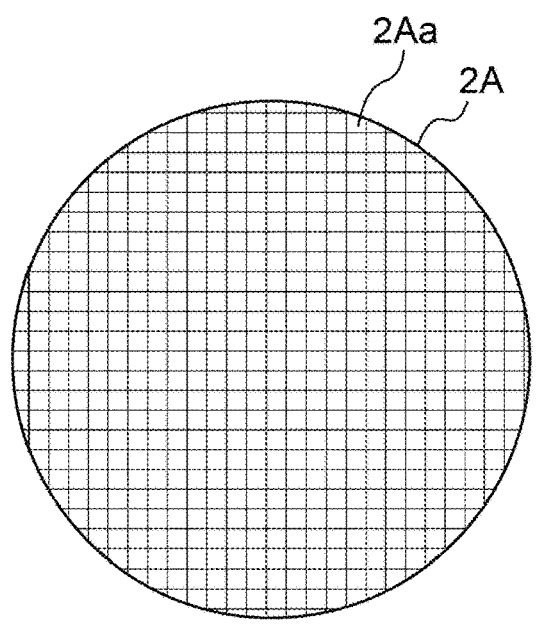
FIG. 7A is a schematic view showing an example of a method for producing the RFID tag of FIG. 6.
Figure 7B:
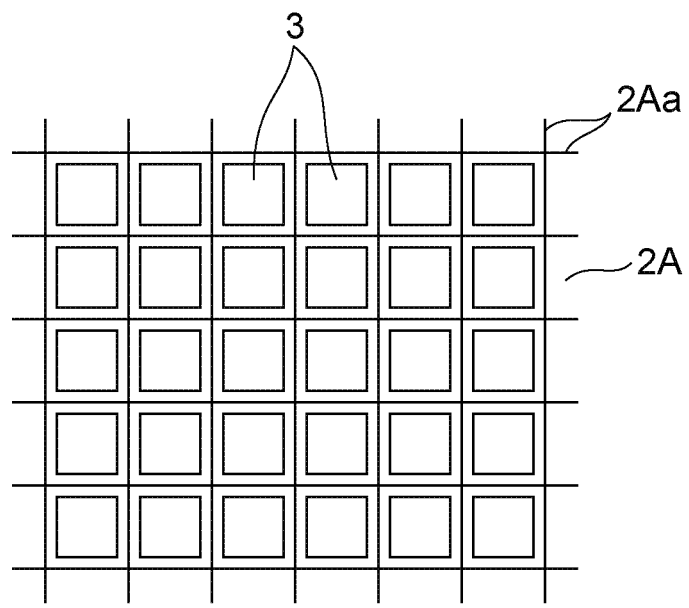
FIG. 7B is an enlarged view showing a step following FIG. 7A.
Figure 7C:
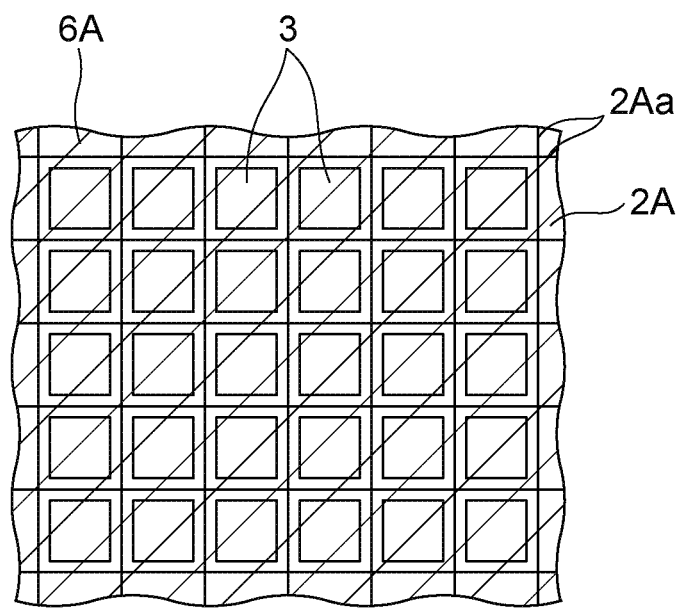
FIG. 7C is an enlarged view showing a step following FIG. 7B.
Figure 7D:
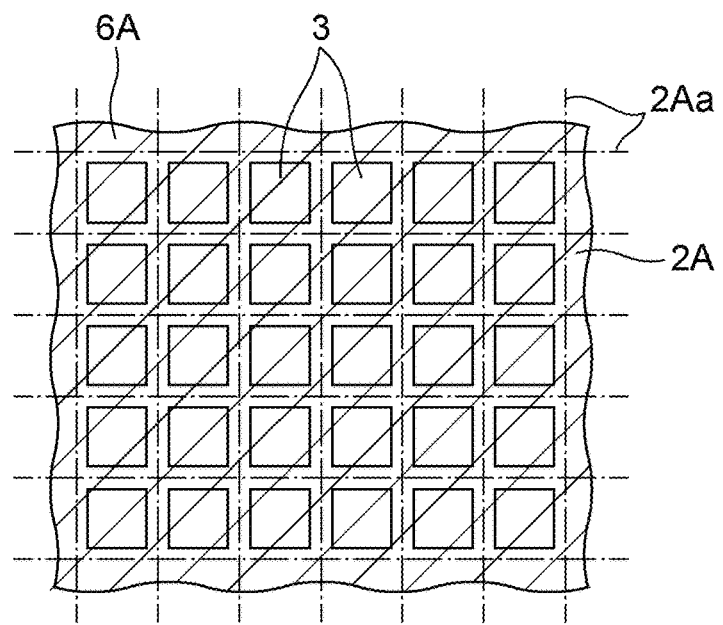
FIG. 7D is an enlarged view showing a step following FIG. 7C.

First, as shown in FIG. 7A, a wafer 2A used as a material of the RFIC element 2 is prepared. The wafer 2A is provided with dicing lines 2Aa serving as a guide during dicing of the wafer 2A described later.

Subsequently, the multiple inductor elements 3 each having the coiled antenna 32 built in the substrate 31 are prepared.

Subsequently, as shown in FIG. 7B, the inductor elements 3 are electrically connected onto the wafer 2A such that the winding axis 32A of the coiled antenna 32 becomes parallel to the mounting surface 31A of the substrate 31. More specifically, each one of the inductor elements 3 is arranged via solder on a rectangular region surrounded by the dicing lines 2Aa of the wafer 2A such that the winding axis 32A of the coiled antenna 32 becomes parallel to the mounting surface 31A of the substrate 31. The solder is then cured by reflow to electrically connect the multiple inductor elements 3 onto the wafer 2A.

Subsequently, as shown in FIG. 7C, a resin member 6A is formed to seal the multiple inductor elements 3 electrically connected onto the wafer 2A.

Subsequently, as shown in FIG. 7D, the wafer 2A and the resin member 6A are diced into pieces to form individual RFID tags each including one of the inductor elements 3. As a result, the RFID tag shown in FIG. 6 can be obtained.

To manufacture the RFID tag 1 shown in FIG. 1, for example, after the step shown in FIG. 7B, the wafer 2A may be diced into pieces to form individual RFID tags each including one of the inductor elements 3 without performing the step shown in FIG. 7C.

Figure 8:
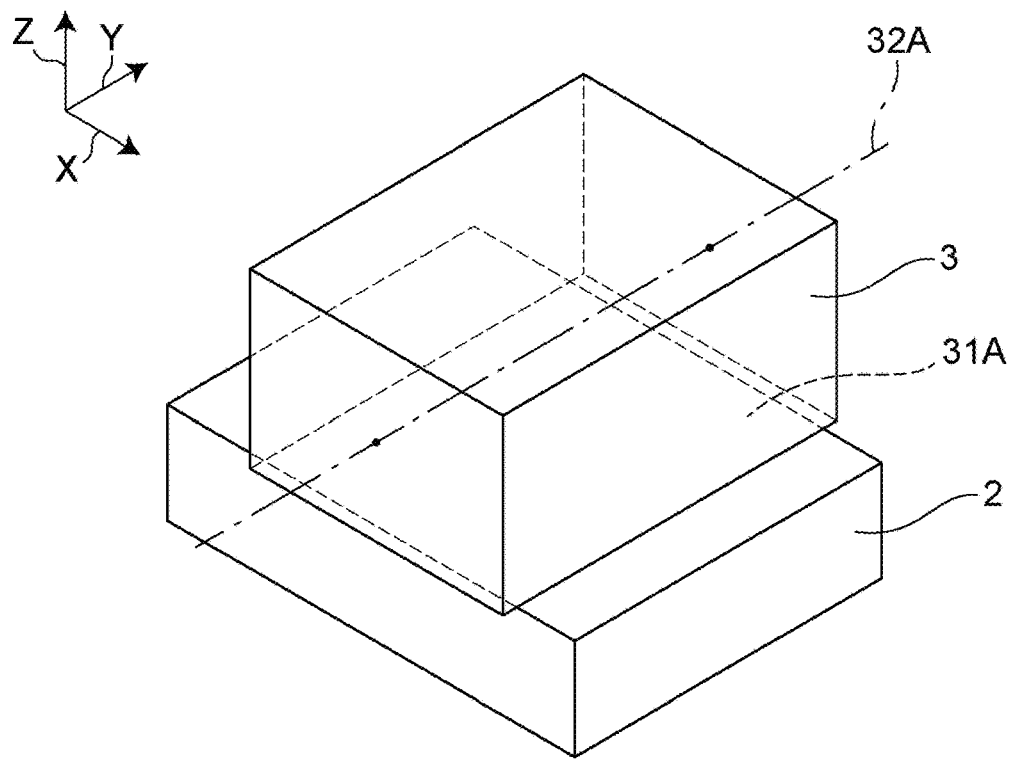
FIG. 8 is a perspective view showing a second modification of the RFID tag of FIG. 1.

In general it is noted that the present disclosure is not limited to the embodiment and can be implemented in various other forms. For example, although the RFIC element 2 has a size including the inductor element 3 when viewed in the direction (i.e., the Z direction) orthogonal to the mounting surface 31A of the substrate 31 in the above description, the present disclosure is not limited thereto. For example, when viewed in the Z direction, the RFIC element 2 may have the same size as the inductor element 3 or may have a size smaller than the inductor element 3. As shown in FIG. 8, a portion of the disposed inductor element 3 may protrude outside the RFIC element 2 when viewed in the Z direction.

Although the coiled antenna 32 is made up of the laminated coiled antenna in which coil conductor patterns formed on respective layers of the laminated body are coupled by interlayer connecting conductors in the above description, it is noted that the present disclosure is not limited thereto. For example, in an alternative aspect, the coiled antenna 32 may be a wound coil formed by winding a single linear antenna conductor into a coil.

Figure 9:
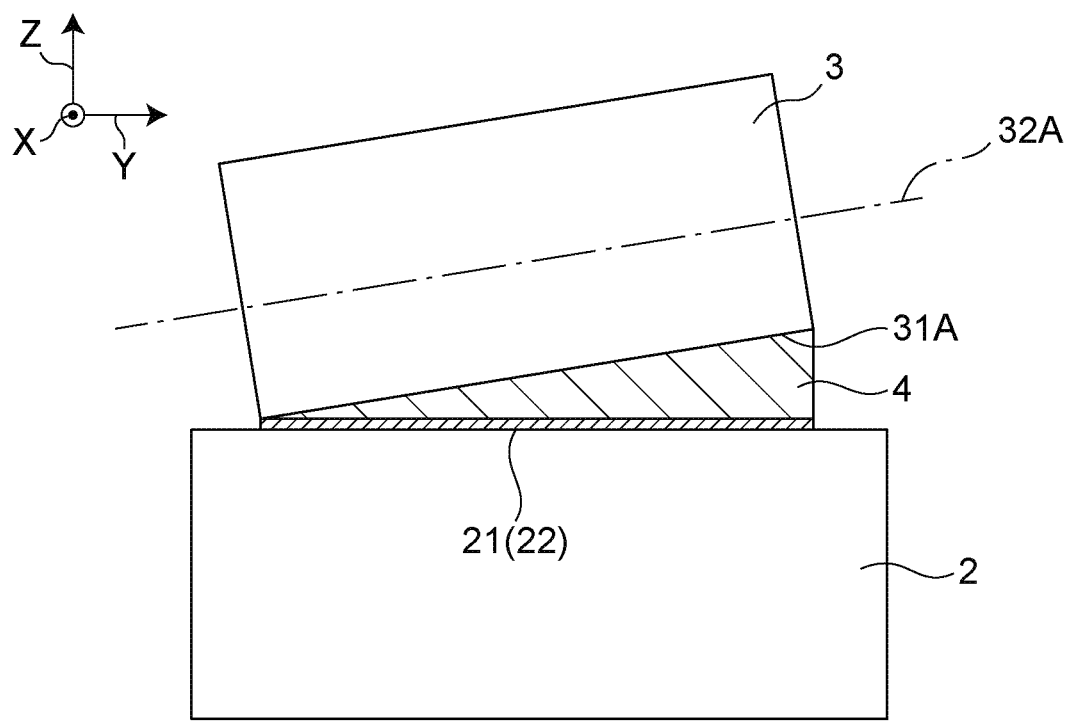
FIG. 9 is a perspective view showing a third modification of the RFID tag of FIG. 1.
Figure 10:
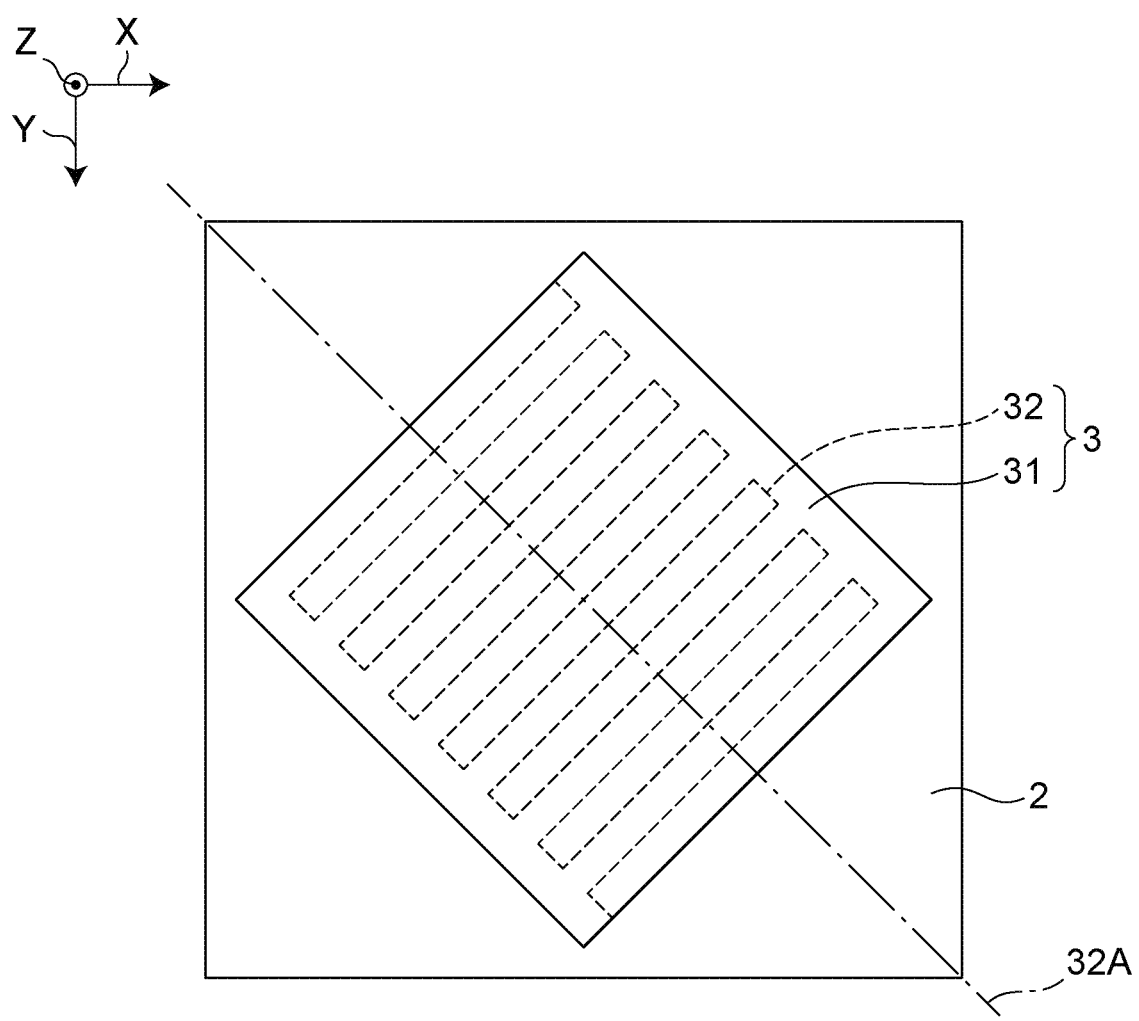
FIG. 10 is a perspective view showing a fourth modification of the RFID tag of FIG. 1.

Although the coiled antenna 32 is disposed such that the winding axis 32A is parallel to the mounting surface 31A of the substrate in the above description, the present disclosure is not limited thereto. For example, in an alternative aspect, as shown in FIG. 9, the coiled antenna 32 may be provided such that the winding axis 32A is inclined with respect to the mounting surface 31A of the substrate 31. In this case, the RFIC element 2 may be disposed without overlapping at least a portion of the opening region of the coiled antenna 32 when viewed in the winding axis direction of the coiled antenna 32. However, as the portion of the RFIC element 2 overlapping with the opening region 32B of the coiled antenna 32 becomes larger when viewed in the winding axis direction of the coiled antenna 32, the flow of the magnetic flux passing through the opening region 32B in the winding axis direction is further hindered. Therefore, when viewed in the winding axis direction of the coiled antenna 32, it is desirable that the RFIC element 2 does not overlap with, for example, 80% or more of the opening region 32B of the coiled antenna 32.

Although the winding axis 32A of the coiled antenna 32 is configured to be orthogonal or perpendicular to each side of the RFIC element 2 when viewed in the Z direction as shown in FIG. 4 in the above description, the present disclosure is not limited thereto. For example, in an alternative aspect, the winding axis 32A of the coiled antenna 32 may be configured to incline by, for example, 45 degrees with respect to each side of the RFIC element 2.

Although the present disclosure has been sufficiently described in terms of preferable embodiments with reference to the accompanying drawings, various modifications and corrections are apparent to those skilled in the art. It should be understood that such modifications and corrections are included in the present disclosure without departing from the scope of the present disclosure.

The exemplary embodiments described herein provide for an RFID tag that is configured to be used in an RFID system with a further reduction in size achieved while suppressing a decrease in communication distance.

EXPLANATIONS OF LETTERS OR NUMERALS

1 RFID tag
2 RFIC element
2A wafer
2Aa dicing line
3 inductor element
4 solder
5 power feeding part
6, 6A resin member
21, 22 input/output terminals
31 substrate
31A mounting surface
32 coiled antenna
32A winding axis
32B opening region

The invention claimed is:
1. An RFID tag comprising:
an inductor element having a coiled antenna disposed in a substrate having a mounting surface; and
an RFIC element that is a chip-shaped component that is configured to process the transmission and reception of a data communication signal and that is mounted on the mounting surface of the substrate and electrically connected to the coiled antenna,
wherein a winding axis of the coiled antenna is parallel to or inclined with respect to the mounting surface of the substrate,
wherein an area of a mounting surface of the chip-shaped component that faces the mounting surface of the substrate is larger than an opening area of the coiled antenna viewed in a direction of the winding axis of the coiled antenna, and
wherein the RFIC element does not overlap at least a portion of an opening of the coiled antenna when viewed in the direction of the winding axis of the coiled antenna.

2. The RFID tag according to claim 1, wherein the RFIC element is disposed outside the coiled antenna without overlapping the opening of the coiled antenna when viewed in the direction of the winding axis of the coiled antenna.

3. The RFID tag according to claim 1, wherein the RFIC element has a size at least as large as the inductor element when viewed in the direction orthogonal to the mounting surface of the substrate.

4. The RFID tag according to claim 3, wherein the RFIC element has a same size as the inductor element when viewed in the direction orthogonal to the mounting surface of the substrate.

5. The RFID tag according to claim 1, wherein the RFIC element is a wafer level package structure.

6. The RFID tag according to claim 1, further comprising a mounting portion between the inductor element and the RFIC element that is sealed with a resin member.

7. The RFID tag according to claim 1, wherein the substrate comprises a laminated body having a plurality of laminated dielectric layers or magnetic layers.

8. The RFID tag according to claim 7, wherein the coiled antenna comprises a laminated coiled antenna having a plurality of coil conductor patterns disposed on respective layers of the laminated body that are coupled to each other by interlayer connecting conductors.

9. The RFID tag according to claim 1, wherein the RFIC element does not overlap an entirety of the opening of the coiled antenna when viewed in the direction of the winding axis of the coiled antenna.

10. The RFID tag according to claim 1, wherein the RFIC element has a size that is larger than the inductor element when viewed in the direction orthogonal to the mounting surface of the substrate.

11. The RFID tag according to claim 10, wherein the coiled antenna of the inductor element comprises a length of 0.35 mm in an X direction, a length of 0.15 mm in a Y direction, and a length of 0.15 mm in a Z direction that is orthogonal to the X and Y directions.

12. The RFID tag according to claim 1, wherein the RFIC element does not overlap at least 80% of the opening of the coiled antenna when viewed in the direction of the winding axis of the coiled antenna.

13. The RFID tag according to claim 1, wherein the winding axis of the coiled antenna is inclined by 45 degrees with respect to each side of the mounting surface of the substrate.

14. The RFID tag according to claim 1, wherein the opening area of the coiled antenna has a height dimension that is larger than a height dimension of the RFIC element in the direction orthogonal to the mounting surface of the substrate.

15. An RFID tag comprising:
an RFIC element that is a chip-shaped component that is configured to process the transmission and reception of a data communication signal; and
an inductor element including a substrate having a mounting surface coupled to the RFIC element and a coiled antenna disposed in the substrate, such that at least a portion of an opening of the coiled antenna does not overlap the RFIC element when viewed in a direction of the winding axis of the coiled antenna, wherein a mounting surface of the chip-shaped component that faces the mounting surface of the substrate has an area that is larger than an opening area of the coiled antenna viewed in the direction of the winding axis.

16. The RFID tag according to claim 15, wherein the RFIC element is electrically connected to the coiled antenna.

17. The RFID tag according to claim 15, wherein the winding axis of the coiled antenna is parallel to or inclined with respect to the mounting surface of the substrate.

18. The RFID tag according to claim 15, further comprising a mounting portion between the inductor element and the RFIC element that is sealed with a resin member.

19. A method for manufacturing an RFID tag comprising:
preparing a wafer configured as a material of an RFIC element that includes at least one chip-shaped component configured to process the transmission and reception of a data communication signal and that is;
preparing multiple inductor elements each having a coiled antenna formed in a substrate;
electrically connecting the multiple inductor elements onto the wafer such that a winding axis of each coiled antenna is parallel to or inclined with respect to a mounting surface of the substrate; and
dicing the wafer into a plurality of pieces to form individual RFID tags that each include one of the multiple inductor elements and the at least one chip-shaped component mounted thereto, wherein an area of a mounting surface of the at least one chip-shaped component that faces the mounting surface of the substrate of the respective individual RFID tag is larger than an opening area of the coiled antenna viewed in a direction of the winding axis of the coiled antenna.

20. The method for manufacturing the RFID tag according to claim 19, comprising:
forming a resin member to seal the multiple inductor elements electrically connected onto the wafer; and
after forming the resin member, dicing the wafer and the resin member into respective pieces to form the individual RFID tags that each include one of the multiple inductor elements.

21. The method for manufacturing the RFID tag according to claim 19, further comprising mounting the respective inductor elements to the wafer such that respective opening of each coiled antenna does not overlap a mounting surface of the wafer when viewed in a direction of the winding axis of the respective coiled antenna.

* * * * *